(12) United States Patent
Marivoet et al.

(10) Patent No.: US 11,680,844 B2
(45) Date of Patent: Jun. 20, 2023

(54) SENSOR SYSTEM FOR A DISPLAY RACK

(71) Applicants: Pure Value Europe NV, Sint-Amands (BE); Pure Value Netherlands BV, Noordwijk (NL)

(72) Inventors: Geert Marivoet, Sint-Amands (BE); Bram Schijndel, Noordwijk (NL)

(73) Assignee: PURE VALUE NETHERLANDS BV, Noordwijk (NL)

( * ) Notice: Subject to any disclaimer, the term of this patent is extended or adjusted under 35 U.S.C. 154(b) by 381 days.

(21) Appl. No.: 16/663,602

(22) Filed: Oct. 25, 2019

(65) Prior Publication Data

US 2020/0132538 A1 Apr. 30, 2020

(30) Foreign Application Priority Data

Oct. 25, 2018 (EP) .................................... 18202661

(51) Int. Cl.
*G06Q 20/20* (2012.01)
*G01C 21/36* (2006.01)
(Continued)

(52) U.S. Cl.
CPC ........... *G01G 19/42* (2013.01); *A47F 5/0018* (2013.01); *G01L 1/2287* (2013.01); *G06Q 10/087* (2013.01)

(58) Field of Classification Search
CPC ..... G01G 19/42; A47F 5/0018; G01L 1/2287; G06Q 10/087; A47B 87/02; A47B 87/027;
(Continued)

(56) References Cited

U.S. PATENT DOCUMENTS 5,671,362 A * 9/1997 Cowe ........................ G07F 7/00
340/568.1
10,092,099 B1 * 10/2018 Linari .................... A47B 61/04
(Continued)

FOREIGN PATENT DOCUMENTS

WO 2006107970 A2 10/2006
WO 2006116665 A1 11/2006
(Continued)

OTHER PUBLICATIONS

Stefanescu, Dan Mihai; "Handbook of Force Transducers: Principles and Components", Springer (2011).

*Primary Examiner* — Nathan C Uber
*Assistant Examiner* — Matthew S Weronski
(74) *Attorney, Agent, or Firm* — Cermak Nakajima & McGowan LLP; James Creighton Wray

(57) ABSTRACT

A display rack comprises shelves and a base. Each shelf comprises a sensor mat comprising a lattice of load sensors. The base is configured for measuring a total weight, which includes weights of any objects positioned on the shelves. The system is configured for determining object addition or removal event data based on in time corresponding changes of: total weight measured at the base; and binary load status of multiple load sensors of a sensor mat of the display rack. A binary load status of a load sensor indicates whether the load sensor at least in part supports an object or not. The event data comprises: an object weight based on said change of total weight measured at the base; and an object support shape and an object location both based on said change of binary load status of multiple load sensors of said sensor mat of the display rack.

10 Claims, 2 Drawing Sheets

(51) Int. Cl.
  *G01C 21/34* (2006.01)
  *G01G 19/42* (2006.01)
  *A47F 5/00* (2006.01)
  *G01L 1/22* (2006.01)
  *G06Q 10/087* (2023.01)

(58) Field of Classification Search
  CPC ............ A47B 87/0207; A47B 87/0215; A47B 87/0223; A47B 87/023; A47B 87/0246; B42F 7/12
  USPC .......................................................... 705/28
  See application file for complete search history.

(56) References Cited

U.S. PATENT DOCUMENTS

| | | | | |
|---|---|---|---|---|
| 10,198,710 | B1* | 2/2019 | Hahn | G01G 19/4144 |
| 10,222,279 | B1* | 3/2019 | Legrand, III | G01L 1/20 |
| 10,664,795 | B1* | 5/2020 | Worley | G06Q 10/087 |
| 2018/0107970 | A1 | 4/2018 | Jones | |

FOREIGN PATENT DOCUMENTS

| WO | 2017180752 A1 | 10/2017 |
|---|---|---|
| WO | 2018109655 A1 | 6/2018 |

* cited by examiner

SENSOR SYSTEM FOR A DISPLAY RACK

This application claims the benefit of European Application No. 18202661.7 filed Oct. 25, 2018, which is hereby incorporated by reference in its entirety as if fully set forth herein.

TECHNICAL FIELD

The invention pertains to the technical field of sensor systems for display racks.

BACKGROUND

WO 2006/116 665 A1 describes a presence, pattern and weight sensor surface. In an embodiment, a sensor surface may comprise a matrix of sensors, such as force sensitive resistive material sensors. The document discloses that pressure sensitive materials may have limited displacement and that therefore the weight distribution from cell to cell may not be balanced or consistent, for which technical problem the document proposes to place a compressive material on top of the sensor surface.

The applicant has found that utilizing a matrix of sensors for both pattern and weight determination of objects requires a trade-off. In order to determine a total weight of objects, a compressive material on top of the matrix of sensors yields better results, as there is a better transfer of force to the sensors. However, a compressive material on top of the matrix of sensors also blurs object patterns. Furthermore, a matrix of sensors is prone to weight accuracy deterioration during its life cycle.

WO 2018/109 655 A1 discloses a foldable display rack with shelves and telescopic pairs of sidewalls, whereby the sidewalls are hingedly connected to a first shelf and slideably attached to a second shelf. In an embodiment (page 15 line 26 to page 16 line 5), the display rack comprises a weighing sensor, wherein the weighing sensor is a location-sensitive textile comprising one or more pressure sensors, which can be adhered to a shelf of the display. In said embodiment, based on the weight of a product and/or the supporting surface of a product, the number of products that are present on a shelf, as well as their location, can be monitored. Additionally or alternatively (page 16 lines 7 to 14), the display rack may comprise a weighing sensor at each of the wheels of the display, for detecting addition or removal of identical objects; or diverse types of objects clearly differing in weight.

An aim of the present invention is the accurate determination of an object type upon addition or removal of an object to/from a shelf of the display rack. The present invention aims to determine object type via determination of object weight and object support shape. The present invention additionally aims to determine object location upon addition or removal of the object, e.g. for triggering replenishment of a particular shelf in a supermarket.

Improvement has thus far focused on improving a sensor mat, e.g. a matrix of force-sensitive resistors, to both accurately determine an absolute weight as well as granularity. An additional consideration is the lifetime of a sensor mat, in high throughput environments, e.g. a supermarket. Existing sensor mats are insufficiently accurate and/or overly expensive and/or too delicate.

WO 2018/109 655 A1 discloses possibility of joint presence of both weighing sensors (location sensitive textile comprising pressure sensors adhered to each shelf; and weighing sensor at each wheel), but remains silent on combining data from both weighing sensors. The document in particular remains silent on combining in time corresponding changes of data from both sensors.

Furthermore, weighing sensors at a wheel absorb torsional deformation impacts upon rolling over uneven terrain, significantly deteriorating their accuracy during their life cycle.

The applicant aims to provide an improved sensor system for accurately determining each of a location, a support shape, and a weight of an object. The present invention aims to resolve at least some of the problems mentioned above.

SUMMARY OF THE INVENTION

In a first aspect, the present invention provides a system comprising a display rack (1), wherein the display rack comprises multiple shelves (2', 2", 2''', 2'''') and a base (4) for supporting the 5 shelves, wherein each of the shelves comprises a sensor mat (5) comprising a lattice of load sensors, wherein the base is configured for measuring a total weight, wherein the total weight includes weights of any objects positioned on the shelves, characterized in that, the system is configured for determining object addition or removal event data based on in time corresponding changes of:
  total weight measured at the base; and
  binary load status of multiple load sensors of a sensor mat of the display rack, wherein a binary load status of a load sensor indicates whether the load sensor at least in part supports an object or not, wherein the object addition or removal event data comprises:
  an object weight based on said change of total weight measured at the base; and
  an object support shape and an object location both based on said change of binary load status of multiple load sensors of said sensor mat of the display rack.

In a second aspect, the present invention provides a method for determining an object weight, an object support shape and an object location upon addition or removal of an object from a shelf of a display rack, wherein the display rack comprises multiple shelves and a base for supporting the shelves, wherein each shelf comprises a sensor mat comprising a lattice of load sensors, wherein the method comprises the steps of:
  measuring at the base a first total weight prior to said addition or removal and a second total weight posterior to said addition or removal;
  determining a first binary load status of the load sensors of the sensor mats of the shelves prior to said addition or removal and a second binary load status of the load sensors of the sensor mats of the shelves posterior to said addition or removal, wherein a binary load status of a load sensor indicates whether the load sensor at least in part supports an object or not;
  determining said object weight based on said second and first total weights; and
  determining said object support shape and said object location based on said second and first binary load status.

The measured data allows to determine a weight, a support shape, and a location of an object upon addition or removal of the object. The determination relies on determination prior to and posterior to addition or removal of the object of: a total weight and a binary load status of sensors of the sensor mats. The total weight is measured at a base supporting multiple shelves, and thereby includes the weights of any objects positioned on the shelves. The object weight may be determined based on difference of total weight posterior to and prior to said addition or removal. The object support shape and object location may be determined based on difference of binary load status posterior to and prior to said addition or removal.

In the present invention, the sensor mats are used to determine a binary load status, i.e. whether a sensor of the lattice at least in part supports an object or not. Thereto, either a sensor mat only allowing to determine binary load status of each sensor of the lattice, or a sensor mat configured to determine a force value exerted on each sensor of the lattice may be utilized. Due to use of said binary load status, even if a sensor mat of the latter type is utilized, deterioration in accuracy during its lifetime, for example due to excessive use, is less of an issue. Alternatively, a simpler sensor mat, only allowing to determine binary load status of each load sensor of the lattice, may also be utilized. Furthermore, there is no trade-off of object support shape accuracy and object weight accuracy at the level of the sensor mat, as the object weight is determined at the base.

DETAILED DESCRIPTION OF THE INVENTION

Figure 1:
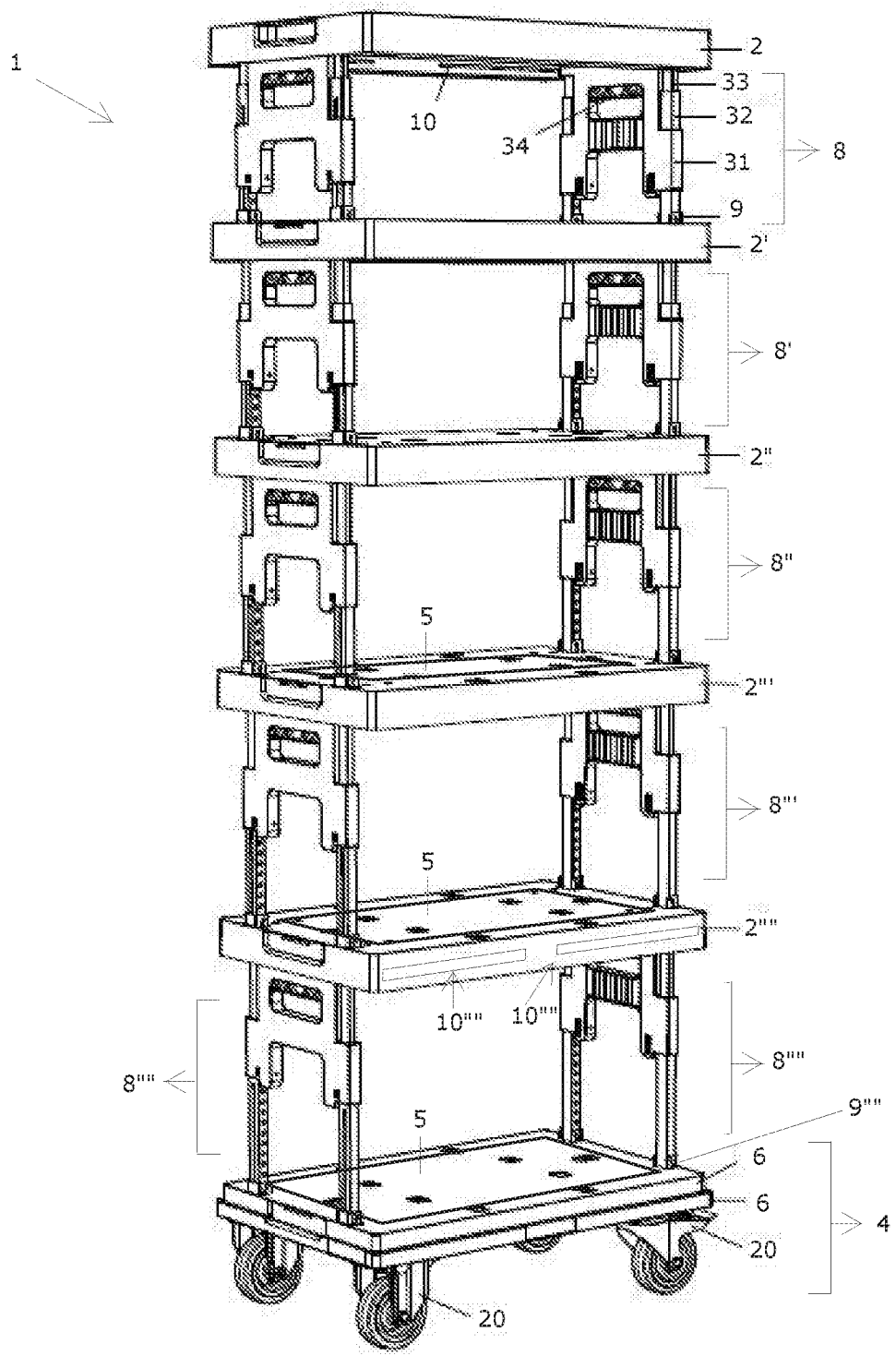
FIG. 1 shows an example of a display rack according to an embodiment of the present invention.

The present invention concerns a system and a method, as summarized in the corresponding section above. In what follows, the invention is described in detail, preferred embodiments are discussed, and the invention is illustrated by means of non-limiting examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

"A", "an", and "the" as used herein refers to both singular and plural referents unless the context clearly dictates otherwise. By way of example, "a compartment" refers to one or more than one compartment.

"Comprise", "comprising", "comprises" and "comprised of" as used herein are inclusive or open-ended terms that specify the presence of what follows (e.g. a component) and do not exclude or preclude the presence of additional, non-recited components, features, elements, members, steps, known in the art or disclosed therein.

In a first aspect, the invention provides a system. The system comprises a display rack. The display rack comprises multiple shelves and a base for supporting the shelves. Each of the shelves comprises a sensor mat comprising a lattice of load sensors. The base is configured for measuring a total weight. The total weight includes weights of any objects positioned on the shelves. The system is configured for determining object addition or removal event data, based on in time corresponding changes of total weight measured at the base and binary load status of multiple load sensors of a sensor mat of the display rack. A binary load status of a load sensor indicates whether the load sensor at least in part supports an object or not. A binary load status of a load sensor hence indicates presence or absence of at least part of an object on at least part of the load sensor. Preferably, the object addition or removal event data comprises an object weight based on the change of total weight measured at the base. Preferably, the object addition or removal event data comprises an object support shape and an object location both based on the change of binary load status of multiple load sensors of a sensor mat of the display rack.

In a second aspect, the invention provides a method for determining an object weight, an object shape and an object location upon addition or removal of an object from a shelf of a display rack. The display rack comprises multiple shelves and a base for supporting the shelves. Each shelf comprises a sensor mat comprising a lattice of load sensors. The method comprises several steps. At the base, a first total weight is measured prior to the addition or removal, and a second total weight is measured posterior to the addition or removal. A first binary load status of the load sensors of the sensor mats of the shelves is determined prior to the addition or removal, and a second binary load status of the load sensors of the sensor mats of the shelves is determined posterior to the addition or removal. A binary load status of a load sensor indicates whether the load sensor at least in part supports an object or not. A binary load status of a load sensor hence indicates presence or absence of at least part of an object on at least part of the load sensor. The object weight is determined based on said second and first total weights. The object shape and the object location are determined based on the second and first binary load status.

In the present invention, the sensor mats are used to determine a binary load status, i.e. whether a sensor of the lattice at least in part supports an object or not. Thereto, either a sensor mat only allowing to determine binary load status of each sensor of the lattice, or a sensor mat configured to determine a force value exerted on each sensor of the lattice may be utilized. Due to use of said binary load status, even if a sensor mat of the latter type is utilized, deterioration in accuracy during its lifetime, for example due to excessive use, is less of an issue. Alternatively, a simpler sensor mat, only allowing to determine binary load status of each load sensor of the lattice, may also be utilized. Furthermore, there is no trade-off of object support shape accuracy and object weight accuracy at the level of the sensor mat, as the object weight is determined at the base.

One of ordinary skill in the art will appreciate that the method according to the second aspect may be performed by a system according to the first aspect. Every feature disclosed in this document may therefore pertain to each of these aspects, even if it has been disclosed in conjunction with a particular aspect. Furthermore, in what follows, references to a specific aspects may therefore have been left out.

The lattice may be a rectangular lattice, a square lattice, a triangular lattice or a hexagonal lattice. A non-limiting list of examples of load sensors comprises a capacitance sensor, a force-sensitive resistance sensor, a linear variable differential transformer sensor, a magnetostrictive sensor, a piezoelectric sensor, a piezoresistive sensor, a strain gauge sensor, a triboelectric sensor, an inductance sensor and an optical sensor. Further examples of load sensors can be found in Dan Mihai Stefanescu, Handbook of Force Transducers: Principles and Components, Springer (2011), ISBN 9783642182969, doi: 10.1007/978-3-642-18296-9. A sensor mat may comprise a lattice of buttons each comprising a force threshold, in which case a load sensor is a button, whereby upon exceeding the force threshold of the button an electric contact is established or broken.

A preferred embodiment of a sensor mat comprises a square lattice of load sensors. Preferably, the square lattice comprises at least 50 by 50 load sensors, more preferably at least 60 by 60 load sensors, such as, for example, 60 by 100 load sensors. A preferred embodiment of a sensor mat comprises a lattice of piezoresistive sensors. A preferred embodiment of a sensor mat comprises load sensors each comprising a surface area of at most 1 cm$^2$, preferably at most 0.5 cm$^2$, more preferably at most 0.2 cm$^2$, even more preferably at most 0.1 cm$^2$, most preferably 0.05 cm$^2$. A most preferred embodiment of a sensor mat comprises a square lattice of piezoresistive sensors each comprising a surface area of at most 1 cm$^2$, preferably at most 0.5 cm$^2$, more preferably at most 0.2 cm$^2$, even more preferably at most 0.1 cm$^2$, most preferably 0.05 cm$^2$. A preferred embodiment of a sensor mat comprises an active surface fraction of at least 80%, preferably at least 85%, more preferably at least 90%, even more preferably at least 95%, yet even more preferably at least 97.5%, and most preferably at least 99%, whereby the active surface fraction is the fraction of an active area of the sensor mat on which load may be detected via the load sensors. An exemplary sensor mat is an Active Matrix Pressure Sensor from InnovationLab GmbH.

The base may comprise one or more weight sensors, wherein the display rack is configured for determining a total weight based on signals from each of said weight sensors. Preferably, the display rack comprises a printed circuit board comprising a processor configured for determining via the processor a total weight based on a sum of partial weights from each of said weight sensors. A partial weight may be based on a signal from a weight sensor, a calibration prefactor and a calibration offset. Preferably, the display rack comprises a temperature sensor. A calibration prefactor and/or a calibration offset may depend on a temperature obtained from the temperature sensor. Preferably, the weight sensors are load cells. A non-limiting list of examples of load cells comprises a capacitance load cell, a force-sensitive resistance load cell, a hydraulic load cell, a linear variable differential transformer load cell, a magnetostrictive load cell, a piezoelectric load cell, a piezoresistive load cell, a pneumatic load cell, a strain gauge load cell, an inductance load cell, and an optical load cell. Further examples of load sensors can be found in Dan Mihai Stefanescu, Handbook of Force Transducers: Principles and Components, Springer (2011), ISBN 9783642182969, doi: 10.1007/978-3-642-18296-9.

In a preferred embodiment, the weight sensors are strain gauge load cells, preferably electrical resistance strain gauge load cells. Exemplary load cells are models CZL928DA or CZL928DAD from Guangdong South China Sea Electronic Measuring Technology Co Ltd.

The system may be the display rack. The system may comprise a computer system. The computer system may comprise at least one processor. The computer system may be configured for wired or wireless data communication with the display rack. The display rack may comprise a transponder for wireless data communication. The transponder may comprise a temperature sensor. The transponder may comprise a shock sensor. The transponder may comprise said printed circuit board. The computer system may be configured for obtaining a total weight measured at the base. The computer system may be configured for obtaining a binary load status of the load sensors of the sensor mats of the display rack. The computer system may be configured for determining the object addition or removal event data via the at least one processor, i.e. on the computer system.

In a preferred embodiment, the system is configured for and the method comprises the step of selecting an identification code from an identification list. The identification list comprises for each of multiple objects an identification code, a reference weight and a reference support shape. The selection may be based on comparison of the determined object weight with the reference weights of the identification list and comparison of the determined object support shape with the reference support shapes of the identification list. The method is then configured for identifying an object. The system may comprise a tangible non-transitory computer-readable storage medium comprising the identification list. The computer system may comprise the storage medium.

In a preferred embodiment, the system and method are configured for detecting addition or removal of an alien object based on determined object weight and determined object support shape. The detection may be based, for example, on attempting to select an identification code from the identification list, and upon failure of the attempt, detecting an alien object.

In a preferred embodiment, the system is configured for determining a fill status of the display rack and sending a fill notification in case the fill status reaches a predetermined undesired fill status. In a preferred embodiment, the method comprises the steps of: determining a fill status of the display rack; determining whether the fill status reaches a predetermined undesired fill status; and in case the fill status reaches a predetermined undesired fill status, sending a fill notification. Preferably, the fill status comprises information on a number of objects in the display rack, a number of objects on a shelf of the display rack, a presence of objects on a desired zone of a shelf of the display rack, a number of objects of a particular type in the display rack, a number of objects of a particular type on a shelf of the display rack and/or a presence of objects of a particular type on a desired zone of a shelf of the display rack. The display rack may be displayed in a store. The fill notification may be intended for a store employee to refill the display rack. The computer system may be configured for sending an electronic message comprising the fill notification to an electronic device of an employee, such as a smartphone. The fill notification may be intended for a supplier or manufacturer to provide additional objects. The computer system may be configured for determining an amount of objects for refilling; comparing the amount of objects for refilling with an amount of objects in stock; deciding based on the comparison whether an order should be placed; and in case an order should be placed, sending an electronic communication comprising the fill notification to an electronic device of a supplier or manufacturer.

In a preferred embodiment, the computer system is configured for gathering consumer statistics based on said event data. The consumer statistics may comprise time information, such as a distribution of object removals over several time bins of a day, a week, a month or a year. The consumer statistics may further comprise other display rack data, such as display rack location, e.g. which store or particular location within a store, and type of commercial visualization, e.g. a type of commercial sleeve around the display or a type of packaging of an object. The display rack may thereto comprise further sensors such as a location sensor for determining display rack location. The transponder may comprise the location sensor.

In a preferred embodiment, the display rack comprises a screen. The system may be configured for displaying time information, such as absolute or relative time information, on a future refill on the screen.

In a preferred embodiment, the system, and preferably the display rack, comprises a consumer proximity sensor for detecting consumer proximity. Consumer proximity may be detected based on a personal electronic device of the consumer, such as, for example, a smartphone.

The system may be configured for displaying a message on the screen upon detecting consumer proximity. The message may be personalized. The personalized message may thereby be based on previous consumer behavior of said consumer, which may be based on object removal or addition event data gathered via similarly configured display racks, or previous purchase lists for which payment data is associated with said personal electronic device. Bank account information may be associated with the personal electronic device. The consumer may be in possession of a credit card in association with a consumer account, whereby the personal electronic device is also associated with the consumer account.

In a preferred embodiment, the system, and preferably the display rack, comprises a contactless payment module. The system may be configured for determining an object price upon removal of an object from a shelf of the display rack. The above mentioned identification list may, for example, further comprise for each of the multiple objects a price. Based on determined object weight and determined object support shape, an object price may be obtained via the identification list. A payment may subsequently be effected via the contactless payment module, based on said obtained price. The contactless payment may be effected via a personal electronic device, a contactless debit card or a contactless credit card.

In a preferred embodiment, the system, and preferably the display rack, comprises an audio, a visual, an audiovisual, or an electronic message alarm system. The system may be configured for issuing a signal via the alarm system upon removal of an object from the display rack. The system may be configured for issuing a signal via the alarm system in case the identification code of the removed object fulfills certain predetermined criteria, e.g. if the identification code of the removed object is of a particular type. The system may be configured for verifying whether a payment is effected via the contactless payment module in conjunction with removal of an object from the display rack, and in case no payment is effected, to issue a signal via the alarm system.

In a preferred embodiment, the display rack comprises a battery. Preferably, the battery is rechargeable. Preferably, the transponder for wireless data communication is based on any one or multiple of the following technologies: 2G, 3G, 3G+, 3GPP, 4G, 4G+, 5G, 6LowPAN, Bluetooth, Bluetooth 4.0, Bluetooth 4.1, Bluetooth 4.2, Bluetooth 5, Bluetooth Low-Energy, CDMA, CDMA2000, Cellular, Dash7, EDGE, EDGE Evolution, EV-DO, Flash-OFDM, GPRS, GSM, HIPERMAN, HSPA, iBurst, IEEE 802.11a, IEEE 802.11ac, IEEE 802.11b, IEEE 802.11g, IEEE 802.11n, IEEE 802.15.4, IEEE 802.15.4-2006, IEEE 802.16, IEEE 802.16-2009, IEEE 802.16m, IEEE 802.20, IPv4, IPv6, LoRaWAN, Low Rate WPAN, LTE, NarrowBand-IoT, Near Field Communication, Neul, RFID, RTT, Sigfox, Thread, UMTS, UMTS W-CDMA, UMTS-TDD, UWB, Weightless, Wi-Fi, WiMAX, Wireless USB, WLAN, WWAN, ZigBee and Z-Wave. Data communication may be effected on request of the computer system or on request of the transponder. Preferably, data communication is triggered upon occurrence of an object addition or removal event, after which the data is sent. This is advantageous as it saves energy.

In a preferred embodiment, the display rack is configured for monitoring a change via either one of the base and the sensor mats, upon which subsequent measurement via the other one of the base and the sensor mats is triggered. A dormant base or dormant sensor mats are advantageous, as they consume less energy.

In a preferred embodiment, the system is configured for and the method comprises the steps of monitoring the total weight measured at the base and determining an updated binary load status of the load sensors of the sensor mats upon detecting a change in the total weight measured at the base. The change in binary load status of multiple load sensors of a sensor mat of the display rack is then determined based on comparison of said updated binary load status with a previously determined binary load status. The previously determined binary load status may have previously been stored on a tangible transitory or non-transitory storage medium of the system, either of the computer system or the display rack.

In an alternative embodiment, the system is configured for and the method comprises the steps of monitoring the binary load status of the load sensors of the sensor mats and measuring an updated total weight at the base upon detecting a change in binary load status of multiple load sensors of a sensor may of the display rack. The change in total weight is then determined based on said updated total weight and a previously measured total weight. The previously measured total weight may have previously been stored on a tangible transitory or non-transitory storage medium of the system, either of the computer system or the display rack.

In a preferred embodiment, the base comprises a base plate comprising multiple weight sensors for supporting the shelves, wherein the display rack is configured for determining a total weight based on signals from each of said weight sensors.

In a preferred embodiment, the shelves comprise a first shelf and the display rack comprises base support elements. Each base support element is hingedly connected to the base plate and slideably attached to the first shelf. The base plate is configured for supporting the base support elements via the weight sensors. Preferably, the base support elements are telescopically extendable.

In a preferred embodiment, a base support element comprises one or more hinge elements defining a hinge axis for the base support element. In this embodiment, the base plate comprises guide rails for hingedly engaging the hinge elements of the base support element, whereby the guide rails comprise a guide path portion in essence perpendicular to the base plate along which the one or more hinge elements can be translated. The base plate is configured for at least partially sinking the base support element in the base plate and onto one or more weight sensors of said multiple weight sensors via translation of the one or more hinge elements of the base support element along said guide path portion.

In an alternative embodiment, the base comprises a base plate, a support plate for supporting the multiple shelves, and multiple weight sensors positioned in between the base and support plates, wherein the multiple weight sensors connect the base and support plates. The display rack is configured for determining a total weight based on signals from each of the multiple weight sensors. Preferably, the multiple weight sensors are four weight sensors. Preferably, the base and support plates are in essence rectangular and comprise four corners. Preferably, each weight sensor is positioned at or near a corner of the base and support plates.

The invention is further described by the following non-limiting example which further illustrates the invention, and is not intended to, nor should it be interpreted to, limit the scope of the invention.

Figure 2:
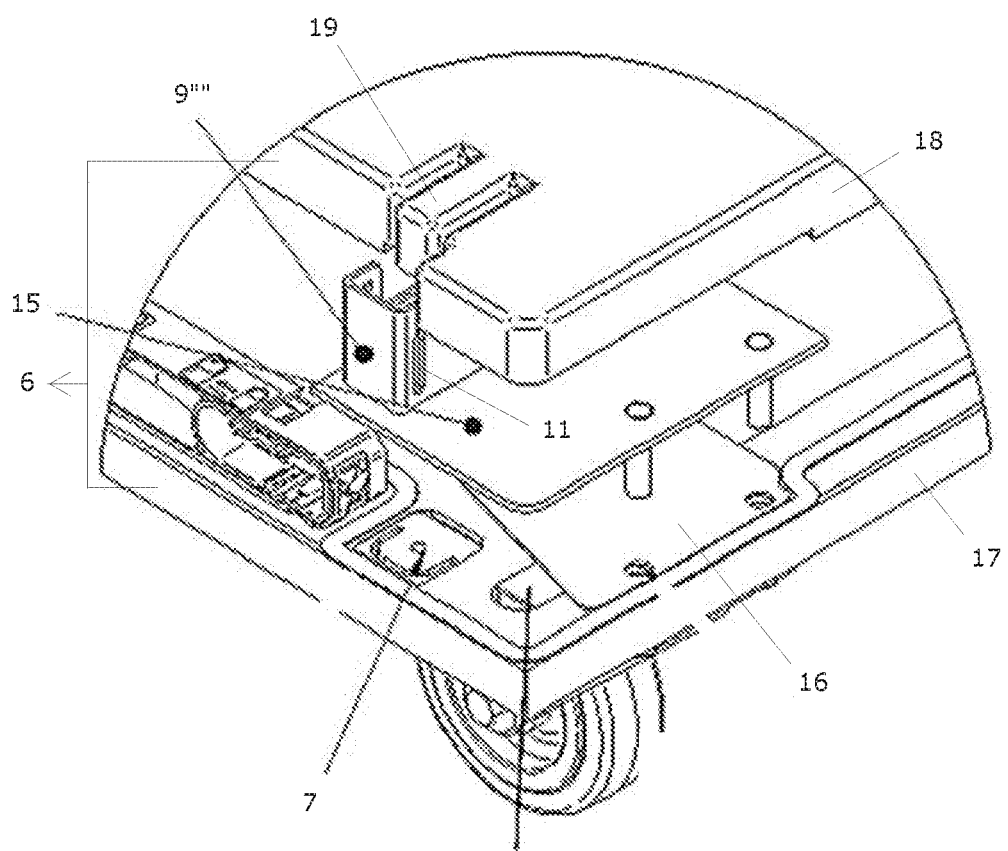
FIG. 2 shows an exploded detail of the example of FIG. 1.

The example pertains to an embodiment of a display rack schematically represented in FIGS. 1 and 2. Certain features of this embodiment closely resemble features disclosed in WO 2018/109 655 A1, which is hereby incorporated in its entirety.

The display rack (1) comprises multiple product shelves (2', 2", 2''', 2''''), each of which comprises a sensor mat (5) comprising a lattice of load sensors. The display rack comprises a top shelf (2). The display rack comprises a base (4) for supporting the shelves. The base comprises wheels (20) and a base plate (6). Each shelf (2, 2', 2", 2''', 2'''') is supported by support elements (8, 8', 8", 8''', 8''''), in the present case telescopically extendable sidewalls. A telescopically extendable sidewall (8) comprises a pair of telescopic arms (32, 33) and a frame (31). Each telescopic arm comprises an outer sleeve (32) telescopically movable relative to the frame and an inner arm (33) in essence static with respect to the frame upon telescoping the outer sleeve (32). An outer sleeve (32) comprises a series of holes. The frame (31) comprises protrusion elements and a handle (34) for retracting the protrusion elements (out of holes of the outer sleeves). A sidewall is hingedly connected (9, 9'''') to a shelf or the base plate. In particular, the outer sleeves of the sidewall are hingedly connected to a shelf or the base plate. A sidewall is slideably attached (10, 10'''') to a product shelf or the top shelf. In particular, the frame and/or inner arms are slideably attached to a product shelf or the top shelf.

The display rack in particular comprises a first product shelf (2'''') and base sidewalls (8'''') for supporting the first product shelf. Each base sidewall is hingedly connected (9'''') to the base plate (6) and slideably attached (10'''') to the first product shelf.

The base plate (6) comprises four load cells (7) for directly supporting the base sidewalls, and in particular the outer sleeves of the base sidewalls (FIG. 2). The base plate (6) comprises a bottom plate (17) and a cover plate (18). The bottom plate (6) comprises the load cells (7). The base plate furthermore comprises per load cell (7) a spacer (16) and an aluminum guiding element (15) comprising a guide rail (9'''') for hingedly engaging a base sidewall, and in particular the outer sleeves of the base sidewall. Each outer sleeve comprises one or more protruding hinge elements defining a hinge axis for the sidewall, which may be hingedly engaged in a guide rail. A guide rail comprises a guide path portion (11) in essence perpendicular to the base plate, i.e. in essence vertical in an intended configuration of the display rack, wherein the base plate comprises an in essence horizontal configuration. The one or more hinge elements can be translated along the guide path portion, e.g. by gravity or by an operator. The base plate is in particular configured for at least partially sinking the base sidewall, and in particular the outer sleeves, in the base plate and onto one or more weight sensors of said multiple weight sensors via translation of the one or more hinge elements of the outer sleeves along the guide path portion. The cover plate comprises in particular a delimiting element (19) comprising a vertical wall. The guide rail furthermore comprises three vertical walls. The vertical walls of the delimiting element (19) and the guide rail (9'''') form together a vertical shaft for at least partially sinking an outer sleeve in the base plate.

The invention claimed is:

1. System comprising a display rack (1), wherein the display rack comprises multiple shelves (2', 2", 2'''', 2'''') and a base (4) for supporting the shelves, wherein each of the shelves comprises a sensor mat (5) comprising a lattice of load sensors, wherein the base is configured for measuring a total weight, wherein the total weight includes weights of any objects positioned on the shelves, wherein, the system is configured for determining object addition or removal event data based on in time corresponding changes of:
   total weight measured at the base; and
   binary load status of multiple load sensors of a sensor mat of the display rack,
   wherein a binary load status of a load sensor indicates whether the load sensor at least in part supports an object or not,
   wherein the object addition or removal event data comprises:
   an object weight based on said change of total weight measured at the base; and
   an object support shape and an object location both based on said change of binary load status of multiple load sensors of said sensor mat of the display rack,
   wherein the base comprises a base plate (6) comprising multiple weight sensors (7) for supporting the shelves, wherein the display rack is configured for determining a total weight based on signals from each of said weight sensors
   wherein the shelves comprise a first shelf (2''''), wherein the display rack comprises base support elements (8''''), wherein each base support element is connected (9'''') to the base plate (6) and slideably attached (10'''') to the first shelf, wherein the base plate is configured for supporting the base support elements via the weight sensors; and
   wherein the base support elements are telescopically extendable.

2. System according to preceding claim 1, wherein a base support element comprises one or more hinge elements defining a hinge axis for the base support element,
   wherein the base plate comprises guide rails (9'''') for engaging the one or more hinge elements of the base support element, whereby the guide rails comprise a guide path portion (11) in essence perpendicular to the base plate along which the one or more elements can be translated, wherein the base plate is configured for at least partially sinking the base support element in the base plate and onto one or more weight sensors of said multiple weight sensors via translation of the one or more elements of the base support element along said guide path portion.

3. System according to claim 1, wherein said weight sensors are load cells.

4. System according to claim 1, wherein the system comprises a tangible non-transitory computer-readable storage medium comprising an identification list comprising for each of multiple objects an identification code, a reference weight and a reference support shape, wherein the system is configured for selecting an identification code from the identification list based on comparison of the determined object weight with the reference weights of the identification list and comparison of the determined object support shape with the reference support shapes of the identification list.

5. System according to claim 1, wherein the system is configured for determining a fill status of the display rack, wherein the fill status comprises information on a number of objects in the display rack, a number of objects on a shelf of the display rack, a presence of objects on a desired zone of a shelf of the display rack, a number of objects of a particular type in the display rack, a number of objects of a particular type on a shelf of the display rack and/or a presence of objects of a particular type on a desired zone of a shelf of the display rack, and wherein the system is configured for sending a fill notification in case the fill status reaches a predetermined undesired fill status.

6. System according to claim 1, wherein the system is configured for:
monitoring the total weight measured at the base; and
determining an updated binary load status of the load sensors of the sensor mats upon detecting a change in the total weight measured at the base,
wherein the change in binary load status of multiple load sensors of a sensor mat of the display rack is determined based on comparison of said updated binary load status with a previously determined binary load status.

7. System according to claim 1, wherein the system is configured for:
monitoring the binary load status of the load sensors of the sensor mats; and
measuring an updated total weight at the base upon detecting a change in binary load status of multiple load sensors of a sensor mat of the display rack,
wherein the change in total weight is determined based on said updated total weight and a previously measured total weight.

8. System according to claim 1, wherein the system comprises a computer system comprising at least one processor, wherein the computer system is configured for wired or wireless data communication with the display rack, wherein the computer system is configured for obtaining a total weight measured at the base, obtaining a binary load status of the load sensors of the sensor mats of the display rack, and determining the object addition or removal event data on the computer system via the at least one processor.

9. System according to claim 3, wherein the load cells are strain gauge load cells.

10. System according to claim 9, wherein the strain gauge load cells are electrical resistance strain gauge load cells.

\* \* \* \* \*